United States Patent
Zhao et al.

(10) Patent No.: US 9,574,133 B2
(45) Date of Patent: Feb. 21, 2017

(54) FRAME-SEALING ADHESIVE COMPOSITION, METHOD OF PREPARING THE SAME, AND DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiuqiang Zhao, Beijing (CN); Hao Wu, Beijing (CN); Yanyan Yin, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 228 days.

(21) Appl. No.: 14/387,510

(22) PCT Filed: Nov. 15, 2013

(86) PCT No.: PCT/CN2013/087269
§ 371 (c)(1),
(2) Date: Sep. 23, 2014

(87) PCT Pub. No.: WO2014/190683
PCT Pub. Date: Dec. 4, 2014

(65) Prior Publication Data
US 2016/0244662 A1 Aug. 25, 2016

(30) Foreign Application Priority Data
May 29, 2013 (CN) .......................... 2013 1 0205868

(51) Int. Cl.
| | |
|---|---|
| *C09K 19/00* | (2006.01) |
| *C09K 11/06* | (2006.01) |
| *C09J 9/00* | (2006.01) |
| *C09J 11/06* | (2006.01) |
| *B32B 7/12* | (2006.01) |
| *C09J 4/00* | (2006.01) |
| *G02F 1/1339* | (2006.01) |
| *C08K 5/45* | (2006.01) |
| *C08K 5/00* | (2006.01) |

(52) U.S. Cl.
CPC ................ *C09K 11/06* (2013.01); *B32B 7/12* (2013.01); *C09J 4/00* (2013.01); *C09J 9/00* (2013.01); *C09J 11/06* (2013.01); *G02F 1/1339* (2013.01); *B32B 2255/26* (2013.01); *B32B 2307/422* (2013.01); *B32B 2457/202* (2013.01); *C08K 5/0041* (2013.01); *C08K 5/45* (2013.01); *C09K 2211/1044* (2013.01); *C09K 2211/1092* (2013.01)

(58) Field of Classification Search
CPC ............. C09K 11/06; C09K 2211/1044; C09K 2211/1092; B32B 7/12; B32B 2255/26; B32B 2307/422; B32B 2457/202; C09J 4/00; G02F 1/1339; G02F 2001/13398; Y10S 430/163; Y10T 428/10; Y10T 428/1059
USPC ......... 428/1.1, 1.5, 1.53, 1.54, 1.55; 430/20, 430/495.1, 905, 962; 548/247, 455, 462
See application file for complete search history.

(56) References Cited

U.S. PATENT DOCUMENTS

| | | | |
|---|---|---|---|
| 2014/0078457 A1 | 3/2014 | Xiao et al. | |
| 2014/0140751 A1* | 5/2014 | Kobayashi | ............. B05C 17/00 401/194 |

FOREIGN PATENT DOCUMENTS

| | | |
|---|---|---|
| CN | 102585745 A | 7/2012 |
| CN | 102888199 A | 1/2013 |
| CN | 103305153 A | 9/2013 |
| EP | 1437392 A1 | 7/2004 |
| JP | WO 2013001992 A1 * | 1/2013 ............. B05C 17/00 |

OTHER PUBLICATIONS

Dong, Chuan "Environmental Dye and Applications" Chemical Industry Press, Mar. 2009, 4 Pages.
Third Chinese Office Action Appln. No. 201310205868.0; Dated Dec. 30, 2015.
K.K. Rohatgim; "Edition 1 of Fundamental of Optical Chemistry"; Science Press; Feb. 28, 1991; pp. 168-169; Relevant to Claim Nos. 1-7.
Chuan Dong, et al; "Edition 1 of Environmental Dye and Applications", Chemical Industry Press, Mar. 31, 2009; p. 60; Relevant to Claim Nos. 1-7.
Jinliang Sun; "Edition 1 of New Fiber Materials", Shanghai University Press; Aug. 31, 2007, pp. 445-446; Relevant to Claim Nos. 1-7.
Second Chinese Office Action dated Jul. 15, 2015; Appln. No. 201310205868 0.

(Continued)

*Primary Examiner* — Ruiyun Zhang
(74) *Attorney, Agent, or Firm* — Ladas & Parry LLP

(57) ABSTRACT

A frame-sealing adhesive composition and a method of preparing the same. The frame-sealing adhesive composition includes 1.45 wt % to 1.65 wt % of photochromic molecules based on the total weight of the frame-sealing adhesive composition, said photochromic molecules are inert to polymeric materials. The method of producing a frame-sealing adhesive composition includes mixing 1.45 wt % to 1.65 wt % of photochromic molecules based on the total weight of the frame-sealing adhesive composition with a frame-sealing adhesive to form a stirred mixture; and degassing the stirred mixture.

5 Claims, No Drawings

(56) References Cited

OTHER PUBLICATIONS

International Search Report Appln. No. PCT/CN2013/087269; Dated Mar. 13, 2014.
Written Opinion of the international Searching Authority dated Feb. 27, 2014; PCT/CN2013/087269.
Qian-Fu Luo, et al; "A Survey on the Synthesis of Photochromic Material Diarylethenes", Chinese Journal of Organic Chemistry; vol. 27, No. 2, pp. 175-187; Jan. 2007.
First Chinese Office Action dated Feb. 4, 2015; Appln. No. 201310205868.0.

* cited by examiner

FRAME-SEALING ADHESIVE COMPOSITION, METHOD OF PREPARING THE SAME, AND DISPLAY APPARATUS

INVENTION FIELD

Embodiments of the present invention relate to a frame-sealing adhesive composition, a method of preparing the same, and a display apparatus.

BACKGROUND

Among flat display apparatuses, Thin Film Transistor Liquid Crystal Displays (briefly, TFT-LCDs) are characterized by small volume, low power consumption, relatively low cost of production, low radiation, and the like, and predominate in the current market of flat displays.

During the manufacture of TFT-LCDs, a color film substrate and an array substrate need to be bonded together for cell assembly, wherein the bonding material as used is a frame-sealing adhesive. The frame-sealing adhesive serves not only to bond the array substrate and the color film substrate, but also to seal the liquid crystal. Thus, the frame-sealing adhesive is an essential material in the cell assembly process of liquid crystal panels.

Currently, frame-sealing adhesives are primarily composed of epoxy resin-based adhesives, hydrophobic micron-sized silica filler spheres, catalysts, and catalyst solvents. During the process of UV radiation curing and thermal curing, the polymerization of adhesives will result in various degrees of hole and punctures in the frame-sealing adhesive, thereby causing defective problems including air bubbles, contamination, and the like. The lack of the frame-sealing adhesive during the process of coating will directly lead to the loss of product. Thus, a special detecting device should be arranged at the downstream of the coating apparatus for the frame-sealing adhesive to monitor the coating circumstance of the frame-sealing adhesive, so as to avoid the occurrence of a large number of defects. In the current detecting apparatus for the frame-sealing adhesive, the analysis for defecting the frame-sealing adhesive depends primarily on visual observation under microscope which has relatively low precision.

SUMMARY OF THE INVENTION

Embodiments of the present invention provide a frame-sealing adhesive composition, a method of preparing the same, and a display apparatus for improving the convenience and precision of observing the frame-sealing adhesive.

An embodiment of the present invention provides a frame-sealing adhesive composition comprising: 1.45 wt % to 1.65 wt % of photochromic molecules based on the total weight of the frame-sealing adhesive composition, said photochromic molecules are inert to polymeric materials. In particular, the photochromic molecules neither react with any other components of the sealant, nor take part in the reaction of monomers in the frame-sealing adhesive to produce polymers during photocuring and thermal curing.

In one aspect, the photochromic molecules comprises 1.55 wt % to 1.60 wt % of the total weight of the frame-sealing adhesive composition.

In another aspect, the photochromic molecules are diarylethylene-based compounds.

For instance, the diarylethylene-based compounds are represented by the structural formula of:

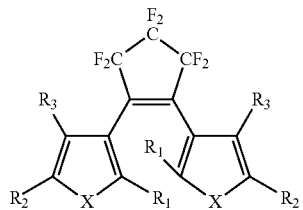

wherein $R^1$ is methyl or ethyl; $R^2$ is hydrogen, hydroxyphenyl, methyl, ethyl, methoxy or halo atom; $R^3$ is hydrogen, methyl or ethyl; and X is N or S. In the above structural formula, the two $R^1$ may be the same or different; the two $R^2$ may be the same or different; and the two $R^3$ may be the same or different.

For instance, the diarylethylene-based compounds are particularly represented by the structural formula of:

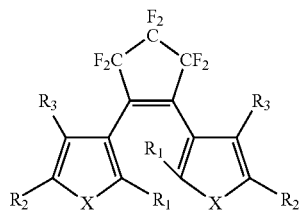

wherein $R^1$ is methyl; $R^2$ is Cl; $R^3$ is H; and X is S.

Another embodiment of the present invention provides a display apparatus comprising two substrates assembled together, wherein the two substrates assembled together are bonded with any of the aforesaid frame-sealing adhesive compositions.

Still another embodiment of the present invention provides a method of preparing a frame-sealing adhesive composition comprising:
adding 1.45 wt % to 1.65 wt % of photochromic molecules based on the total weight of the frame-sealing adhesive composition into a frame-sealing adhesive and stirring the mixture to form a stirred mixture, wherein the photochromic molecules are inert to compound polymeric materials; and degassing the stirred mixture.

The addition of photochromic molecules into the current frame-sealing adhesive can allow the produced frame-sealing adhesive composition to fluoresce under UV radiation, thereby facilitating the observation of morphometry of frame-sealing adhesive. Said current frame-sealing adhesives are those for binding two substrates used in the current process, e.g., epoxy resin-based sealant comprising epoxy resins, photoinitiators, thermal curing agents, silica microspheres, resinous elastic microspheres, etc.

In the frame-sealing adhesive composition of embodiments of the present invention, photochromic molecules which are inert in the compounding of polymeric materials are added into the sealant, and thus the photochromic molecules will not take part in the curing reaction during the curing process of the sealant composition. When testing the defects of the cured sealant composition via UV-radiation on the observation zone of microscope with UV light, the photochromic molecules can fluoresce under excitation of UV light. Since fluorescent is active-emitting light, the imaging of the frame-sealing adhesive in the eyelens are clearer and more complete. Moreover, the photochromic molecules in the holes will exhibit various fluorescent brightness due to the barrier of holes, and thus the imaging of the frame-sealing adhesive will exhibit better three-dimensional effect, thereby facilitating the observation of morphometry of the frame-sealing adhesive and improving the observation precision of the frame-sealing adhesive. Furthermore, using such sealant composition allows to avoid adjusting microscope lens and filters upon observation by using conventional microscopes, saving the process time, improving the analysis efficiency of the defects of the frame-sealing adhesive, thereby improving the yield of final products.

DETAILED DESCRIPTION OF THE INVENTION

To address the prior art problem that observation precision of sealant is relatively low, thereby resulting in the technical problems of product defects, the embodiments of the present invention provide a sealant composition, a method of preparing the same, and a display apparatus. In the sealant composition of the embodiment of the present invention, 1.45 wt % to 1.65 wt % of photochromic molecules are added based on the total weight of the sealant composition. Thus, when testing the defects of sealant, the photochromic molecules emit fluorescence under UV radiation so as to improve the precision of observing the sealant, facilitating clearly finding impurities, punctures, holes, and edge morphometry in the sealant, and improving the analysis precision. For describing the object, technical solution, and advantages of the present invention more detailedly, the following examples are provided to further illustrate the present invention.

An embodiment of the present invention provides a frame-sealing adhesive composition comprising: 1.45 wt % to 1.65 wt % of photochromic molecules which are inert when compounding polymeric materials, based on the total weight of the frame-sealing adhesive composition.

In the embodiments of the present invention, the components of the frame-sealing adhesive composition are the same as those of the prior art frame-sealing adhesive, except incorporating 1.45 wt % to 1.65 wt % of photochromic molecules which are inert in the compounding of polymeric materials. In other words, when the frame-sealing adhesive composition undergoes photocuring and thermal curing, the photochromic molecules will not react with any other component of the frame-sealing adhesive composition, but be directly dispersed in a form of molecules within the frame-sealing adhesive composition. In the embodiments of the present invention, the frame-sealing adhesive composition comprises the photochromic molecules present therein. Therefore, when the frame-sealing adhesive is observed with microscope, a beam of LTV radiation is introduced on the observation zone of microscope. The photochromic molecules emit fluorescence under UV radiation, thereby facilitating finding out the defects of frame-sealing adhesive composition, such as impurities, punctures, holes, etc.; facilitating observing the edge morphometry, and improving the analysis precision of frame-sealing adhesive. Moreover, the photochromic molecules in the holes exhibit various fluorescent brightness due to the barrier of holes, and thus the imaging of frame-sealing adhesive exhibit better three-dimensional effect, thereby facilitating the observation of morphometry of frame-sealing adhesive and improving the observation precision of frame-sealing adhesive. Furthermore, using such frame-sealing adhesive composition allows to avoid adjusting microscope lens and filters upon observation by using conventional microscopes, saving the process time, improving the analysis efficiency of frame-sealing adhesive defects, thereby improving the yield of products.

Preferably, the photochromic molecules comprise 1.55 wt % to 1.60 wt % based on the total weight of the frame-sealing adhesive composition.

In the embodiments of the present invention, adding an excess of photochromic molecules may result in a decrease of bonding property of the frame-sealing adhesive composition; and adding an insufficient amount of photochromic molecules may result in too diluent distribution of photochromic molecules in the frame-sealing adhesive composition, thereby making against the observation of morphometry of frame-sealing adhesive. Thus, it is necessary to add an appropriate amount of photochromic molecules. The inventors find through experiments that the photochromic molecules can comprise 1.45 wt % to 1.65 wt % based on the total weight of the frame-sealing adhesive composition, preferably 1.55 wt % to 1.60 wt % of based on the total weight of the frame-sealing adhesive composition, e.g., 1.45 wt %, 1.48 wt %, 1.50 wt %, 1.55 wt %, 1.58 wt %, 1.60 wt %, 1.62 wt % or 1.65 wt % based on the total weight of the frame-sealing adhesive composition.

Preferably, the photochromic molecules are diarylethylene-based compounds.

In the embodiments of the present invention, diarylethylene-based compounds can be used as the photochromic molecules. Since the diarylethylene-based compounds have good thermal stability, quick response, and relatively high quantum yield. Thus, when the frame-sealing adhesive composition undergoes thermal curing, it can maintain the stability of molecules; when the frame-sealing adhesive undergoes defect analysis, it exhibits quick response, and high fluoroscence brightness, thereby facilitating the observation of frame-sealing adhesive. Other photochromic molecules, such as fulgide, can also be used in the frame-sealing adhesive composition of the embodiments of the present invention.

Preferably, the diarylethylene-based compounds are represented by the structural formula of:

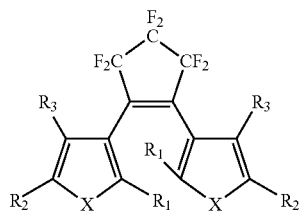

wherein $R^1$ is methyl or ethyl; $R^2$ is hydrogen, hydroxyphenyl, methyl, ethyl, methoxy or halogen atom; $R^3$ is hydrogen, methyl or ethyl; and X is N or S.

As shown in the following structural formula, the left is the open-ring state of the diarylethylene-based compounds, which is colorless; and the right is the closed-ring state of the diarylethylene-based compounds upon being radiated with UV light having a specific wavelength, which is purple. Through the purple fluorescence emitted by the compound, the frame-sealing adhesive is observed for morphometry with higher precision of observation and higher precision of analysis.

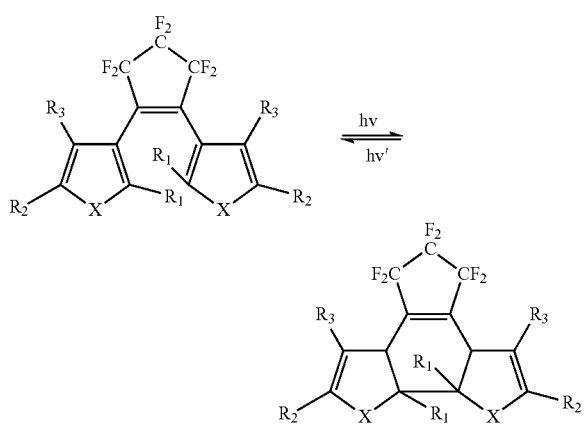

wherein $R_1$, $R_2$, $R_3$ and X are defined as above.

Preferably, the diarylethylene-based compounds are particularly represented by the structural formula of:

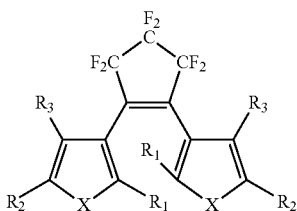

wherein $R^1$ is methyl; $R^2$ is Cl; $R^3$ is H; and X is S.

The embodiments of the present invention further provide a display apparatus comprising two substrates assembled together, wherein the two substrates assembled together are bonded with any of the frame-sealing adhesive compositions of the aforesaid embodiments of the present invention. The display apparatus can be any product or part having a display function, such as liquid crystal panel, electronic paper, OLED panel, mobile, tablet PC, television, display, notebook, digital frame, navigator, and the like.

The embodiments of the present invention further provide a method of preparing the frame-sealing adhesive composition comprising:
adding 1.45 wt % to 1.65 wt % of photochromic molecules into a frame-sealing adhesive based on the total weight of the frame-sealing adhesive composition and stirring the mixture to form a stirred mixture, wherein the photochromic molecules are inert in compounding polymeric materials; and
degassing the stirred mixture.

In the method of preparing the frame-sealing adhesive composition of the embodiments of the present invention, the photochromic molecules which is inert in the compounding of polymer are first mixed with other components of the frame-sealing adhesive by stirring, and then degassed to form the frame-sealing adhesive composition. Since the photochromic molecules are incorporated into the frame-sealing adhesive composition, the observation zone of microscope is subject to UV radiation when the cured frame-sealing adhesive composition is observed under microscope. The photochromic molecules fluorosce under UV radiation, thereby facilitating the observation of morphometry of selant, facilitating screening out the defectivly bonding product of frame-sealing adhesive, improving the pass ratio of product, avoiding the need of adjusting the lens of microscope and the filters, and simplifying the operation of analysis.

The defects of the frame-sealing adhesive composition of the embodiments of the present invention can be examined under the following devices: said devices comprise a microscope, as well a UV lamp from which UV light is emitted for radiating the observation zone of microscope.

Preferably, the light emitted from the UV lamp forms an angle of from 45° to 90° with regard to the plane of the observation zone of the microscope.

The following examples are provided to further illustrate the frame-sealing adhesive composition and the method of preparing the same of the embodiments of the present invention. However, the present invention is not limited to the following examples. The following examples utilize only preferable materials as the components of the frame-sealing adhesive, wherein the frame-sealing adhesive is available from Mitsui Chemical Inc. under the trademark of NO2920; and the added photochromic molecules are diarylethylene-based compounds. The substituents of $R^1$, $R^2$, and $R^3$ in the specific photochromic molecules and the weight percent of the photochromic molecules are listed in Table below.

To the frame-sealing adhesive as list in Table 1, various weight percents of diarylethylene-based compounds are added and stirred at a temperature of, preferably, from 10° C. to 30° C. for 30 to 60 min (e.g., stirred at 29° C. for 30 min, at 18° C. for 45 min, or at 20° C. for 60 min, preferably, stirred at 20° C. for 60 min) to form a stirred mixture. The diarylethylene-based compounds are represented by the structural formula of:

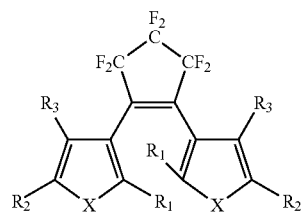

wherein the selected substituents of $R^1$, $R^2$, $R^3$, X and $F_2$ are listed in Table 1.

The stirred mixture as described above can be degassed by using, e.g., the degassing machine under the model SIENOX.

Examination and Analysis Test of Defects

Each frame-sealing adhesive composition as described was applied onto a substrate, and subject to cell assembly with another substrate under vacuum. Then, the assembled cell underwent photocuring under UV radiation for 30 min, followed by thermal curing for 60 min. A microscope was used to examine the defects of frame-sealing adhesive. Upon observation, the observation zone of the microscope was radiated with UV light having a wavelength as listed in Table 1.

TABLE 1

Components and Effect Evaluation of Frame-sealing adhesive Composition

| Ex. | Frame-sealing adhesive | Photochromic Molecules | Weight Percent of Photochromic Molecules | UV Wavelength Upon Observation | Results of Observation |
|---|---|---|---|---|---|
| 1 to 5 | NO2920 | $R^1$ is methyl; $R^2$ is methyl; $R^3$ is hydrogen; and X is S | 1.25 wt % | 365 nm | Unclear difference of morphometry |
| | | | 1.45 wt % | | Visible difference of morphometry |
| | | | 1.50 wt % | | Visible difference of morphometry |
| | | | 1.65 wt % | | Clear difference of morphometry |
| | | | 3.00 wt % | | Unclear difference of morphometry |
| 6 to 11 | NO2920 | $R^1$ is ethyl; $R^2$ is hydroxyphenyl; $R^3$ is methyl; and X is N | 1.45 wt % | 365 nm | Visible difference of morphometry |
| | | | 1.55 wt % | | Clear difference of morphometry |
| | | | 1.60 wt % | | Clear difference of morphometry |
| | | | 1.65 wt % | | Visible difference of morphometry |
| | | | 1.75 wt % | | Unclear difference of morphometry |
| | | | 2.50 wt % | | Unclear difference of morphometry |
| 12 to 16 | NO2920 | $R^1$ is methyl; $R^2$ is chloro; $R^3$ is hydrogen; and X is S | 0.05 wt % | 365 nm | Unclear difference of morphometry |
| | | | 1.35 wt % | | Unclear difference of morphometry |
| | | | 1.45 wt % | | Visible difference of morphometry |
| | | | 1.52 wt % | | Clear difference of morphometry |
| | | | 1.65 wt % | | Visible difference of morphometry |
| 17 to 22 | NO2920 | $R^1$ is ethyl; $R^2$ is methoxy; $R^3$ is hydrogen; and X is N | 0.50 wt % | 365 nm | Unclear difference of morphometry |
| | | | 1.45 wt % | | Visible difference of morphometry |
| | | | 1.48 wt % | | Visible difference of morphometry |
| | | | 1.58 wt % | | Clear difference of morphometry |
| | | | 1.65 wt % | | Clear difference of morphometry |
| | | | 1.85 wt % | | Unclear difference of morphometry |
| 23 to 27 | NO2920 | $R^1$ is methyl; $R^2$ is ethyl; $R^3$ is ethyl; and X is S | 1.45 wt % | 365 nm | Unclear difference of morphometry |
| | | | 1.55 wt % | | Clear difference of morphometry |
| | | | 1.58 wt % | | Clear difference of morphometry |
| | | | 1.60 wt % | | Clear difference of morphometry |
| | | | 1.75 wt % | | Unclear difference of morphometry |

It can be seen from the aforesaid Examples 1 to 27 that the incorporation of photochromic molecules into the frame-sealing adhesive composition facilitates observing the morphometry of frame-sealing adhesive, especially facilitates finding out defects, such as punctures and holes, of the frame-sealing adhesive so as to pick out defective products in good time and improve the pass ratio of product. Moreover, the added photochromic molecules does not affect the bonding property of the original frame-sealing adhesive.

The incorporation of photochromic molecules into the frame-sealing adhesive composition of the embodiments of the present invention facilitates observing the frame-sealing adhesive with better precision, and allows to avoid the need of adjusting the lens of microscope and the filters, thereby simplifying the operation of analysis.

It is apparent that persons skilled in the art can make various modifications and variations to the present invention without departing from the spirit and scope of the present invention. Thus, provided that such modifications and variations of the present invention fall within the scope of the appended claims and their equivalents, the present invention also encompasses these modifications and variations.

We claim:

1. A frame-sealing adhesive composition comprising:
1.45 wt % to 1.65 wt % of photochromic molecules based on the total weight of the frame-sealing adhesive composition, wherein the photochromic molecules are inert to polymeric materials;
wherein the photochromic molecules are represented by the structural formula of:

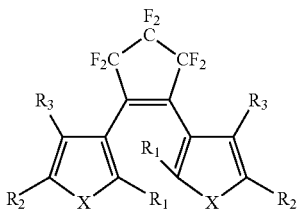

wherein $R^1$ is ethyl; $R^2$ is hydrogen, hydroxyphenyl, methyl, ethyl or methoxy; $R^3$ is methyl or ethyl; and X is N.

2. The frame-sealing adhesive composition of claim 1, wherein the photochromic molecules comprises 1.55 wt % to 1.60 wt % based on the total weight of the frame-sealing adhesive composition.

3. The frame-sealing adhesive composition of claim 1, wherein the photochromic molecules are diarylethylene-based compounds.

4. A display apparatus, comprising two substrates assembled together, wherein the two substrates assembled together are bonded with the frame-sealing adhesive composition of claim 1.

5. A method of preparing a frame-sealing adhesive composition comprising:
adding 1.45 wt % to 1.65 wt % of photochromic molecules based on the total weight of the frame-sealing adhesive composition into a frame-sealing adhesive and stirring the mixture to form a stirred mixture, wherein the photochromic molecules are inert to polymeric materials; and
degassing the stirred mixtures;
wherein the photochromic molecules are represented by the structural formula of:

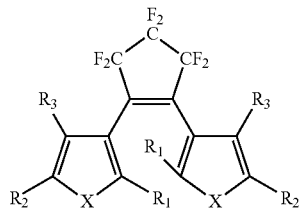

wherein $R^1$ is ethyl; $R^2$ is hydrogen, hydroxyphenyl, methyl, ethyl or methoxy; $R^3$ is methyl or ethyl; and X is N.

* * * * *